United States Patent [19]

Ahn

[11] Patent Number: 5,366,111
[45] Date of Patent: Nov. 22, 1994

[54] DEVICE FOR FEEDING SUPPORTING MEMBER OF CONSTRUCTION PANEL

[76] Inventor: Se-Hong Ahn, Sin Banpo 3rd Apartment 25-505, #1-1, Banpo-dong, Seocho-ku, Seoul, Rep. of Korea

[21] Appl. No.: 97,070

[22] Filed: Jul. 23, 1993

[30] Foreign Application Priority Data

Mar. 6, 1993 [KR] Rep. of Korea ................ 1993-3284

[51] Int. Cl.⁵ ............................................. B65H 5/00
[52] U.S. Cl. ...................................... 221/75; 221/200; 221/237; 221/225
[58] Field of Search ................ 221/75, 200, 201, 225, 221/236, 237, 261, 268, 277

[56] References Cited

U.S. PATENT DOCUMENTS

| | | |
|---|---|---|
| 1,953,257 | 4/1934 | Pierce ................................... 221/75 |
| 2,858,046 | 10/1958 | Pollmann ............................ 221/200 |
| 3,606,081 | 9/1971 | Croteau et al. ...................... 221/75 |
| 3,913,503 | 10/1975 | Becker ................................ 221/236 |
| 4,969,582 | 11/1990 | Gauger ............................... 221/268 |
| 5,102,027 | 7/1992 | Se Hong . | |

Primary Examiner—H. Grant Skaggs
Attorney, Agent, or Firm—Michael J. Striker

[57] ABSTRACT

A supporting member feeding device utilized for manufacturing a construction panel of three dimensional structure, has gears whose teeth partially extend into an interior of an inclined wall of a hopper containing supporting members and rotating in an opposite direction from the direction of the ascending supporting members to smoothly discharge the supporting members toward a chute, and the supporting members discharged from the outlet of the hopper are kept at a predetermined distance by a spiral conveyor whose teeth extend into the chute through a hole of the chute forming member so as to forcibly and exactly feed the supporting members toward an inclined discharging outlet of the chute.

6 Claims, 4 Drawing Sheets

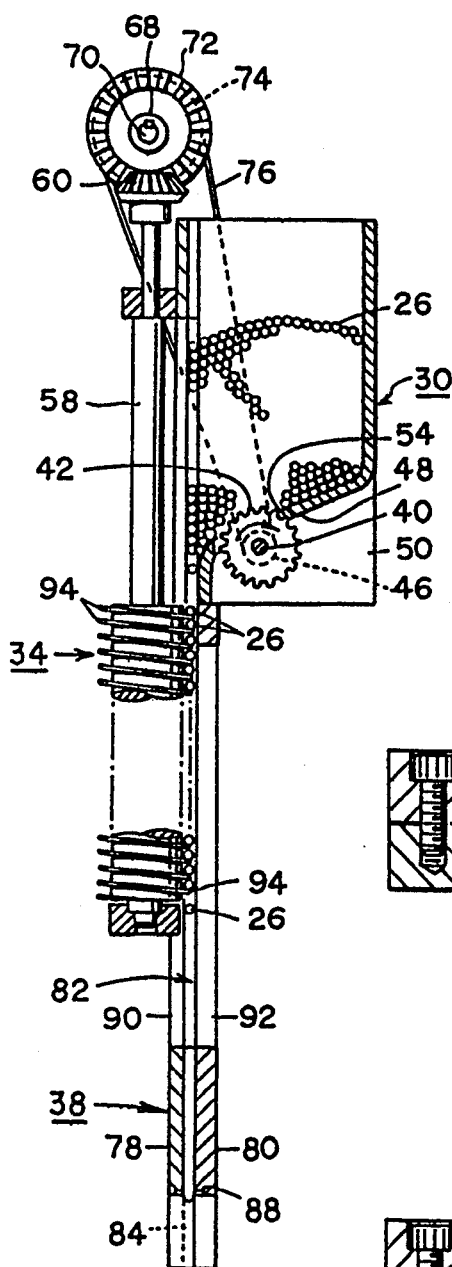
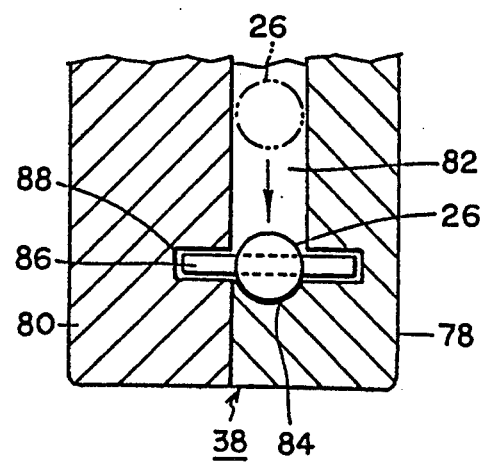
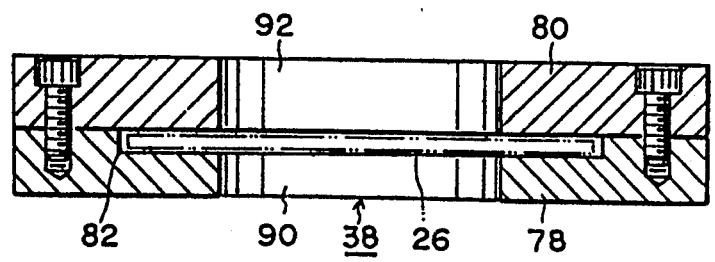
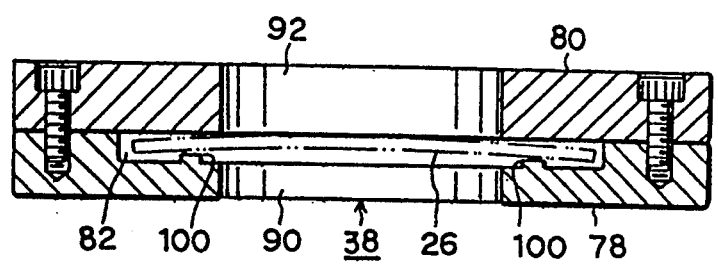

DEVICE FOR FEEDING SUPPORTING MEMBER OF CONSTRUCTION PANEL

BACKGROUND OF THE INVENTION

The present invention relates to a device for feeding a supporting member of a construction panel. More particularly, it relates to a device for feeding a supporting member of a construction panel utilized for manufacturing the construction panel 10 having a three dimensional structure as shown in FIG. 1.

The construction panel 10 has an upper wire mesh 18 arranged with longitudinal wires 14 and latitudinal wires 16 and a lower wire mesh 24 arranged with longitudinal wires 20 and latitudinal wires 22 and positioned with predetermined intervals at the top and bottom of a usual heat insulating core material 12 made of synthetic resin foam such as polystyrene. The panel also has supporting members 26,28 extending in different directions and welded to the upper wire mesh 18 and the lower wire mesh 24 by piercing through the heat insulating core 12.

The supporting members include a first supporting member 26 and a second supporting member 28. Both end portions of the first and second supporting members 26,28 are spot welded to the longitudinal wire meshes 14,20 of the upper and lower wire meshes 18,24.

A method for manufacturing such a construction panel 10 having a three dimensional structure is described in the Korean Utility Model Registration No. 68,190 (U.S. Pat. No. 5,102,027, Chinese Patent Publication No. CN1059950A), and Korean Patent Application No. 92-13061 (U.S. patent application Ser. No. 08/007,846 and Chinese Patent Application No. 92111269.6).

The manufacturing machine described in the above documents has a supporting member feeding device of a rotary type, which comprises a hopper with the supporting members previously cut to a predetermined length, a chute for free dropping the supporting members, and a rotary drum having a number of grooves into which the supporting members are inserted one by one between the hopper and the chute. A vibrating means is attached to the hopper such that the supporting members could be placed well one by one into the interior of the rotary drum.

The diameter of the supporting members of the supporting member feeding device is relatively small, e.g., approximately 2 mm. Therefore, the supporting members located at the outlet side of the hopper, i.e., the supporting members to be located adjacent to the rotary drum, are strongly pressed by a pressure of a sideward direction of the other supporting members located at both its side surfaces and become conglomerated together. Therefore, even if the hopper was vibrated at the upper side of the hopper, a conglomerated state of the supporting members as described above cannot be satisfactorily scattered. As a result, the supporting members are not precisely loaded into the groove of the rotary drum and thereby a feeding error of the supporting members occurs.

The feeding is performed toward the slant outlet at the lowermost side of the chute located below the rotary drum, so that a plunger of a pneumatic pressure-type inserting-through means moving in this region pushes the supporting members toward the outlet. The feeding is performed by a free dropping method by the self weight of the supporting members. As a result, it becomes difficult to make the feeding timing and the inserting-through timing exactly match one another.

SUMMARY OF THE INVENTION

Accordingly, it is an object of the present invention to provide a device for feeding a supporting member of a construction panel, which is a further improvement of the supporting member feeding device disclosed in the above-mentioned patent documents.

In keeping with these objects and with others which will become apparent hereinafter, one feature of the present invention resides, briefly stated, in a supporting member feeding device which is provided with gears having teeth extending into the interior of an outlet side inclined wall of a hopper containing supporting members, which gears rotate in an opposite direction to the direction of the ascending of the supporting members, a chute forming member having two plates which are provided with holes which lead into a chute, and a spiral conveyor which rotates with its teeth extending into the chute through the holes of the chute plates.

When the supporting member feeding device is designed in accordance with the present invention, a gear whose teeth partially extend toward the internal side of the inclined wall adjacent to the outlet side of the hopper is rotated in an opposite direction to a direction in which the supporting members contained in the hopper are going to descend, so that a narrow outlet of the hopper is not blocked by the supporting members so as to smoothly move the supporting members toward the chute.

In accordance with another embodiment of the present invention, the supporting member feeding device of the construction panel is formed so that a spiral conveyor is mounted side by side with the chute so that the supporting members moving out of the outlet of the hopper are forcibly fed precisely toward the lowermost inclined outlet of the chute, keeping a predetermined distance therebetween.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a cross-sectional view taken along the line I—I of FIG. 3;

FIG. 5 is a cross-sectional view taken along the line II—II of FIG. 3;

FIG. 6 is a magnified cross-sectional view taken along the line III—III of FIG. 3; and FIG. 7 is a magnified cross-sectional view showing another embodiment of the chute shown in FIG. 6.

DESCRIPTION OF PREFERRED EMBODIMENTS

Figure 1:
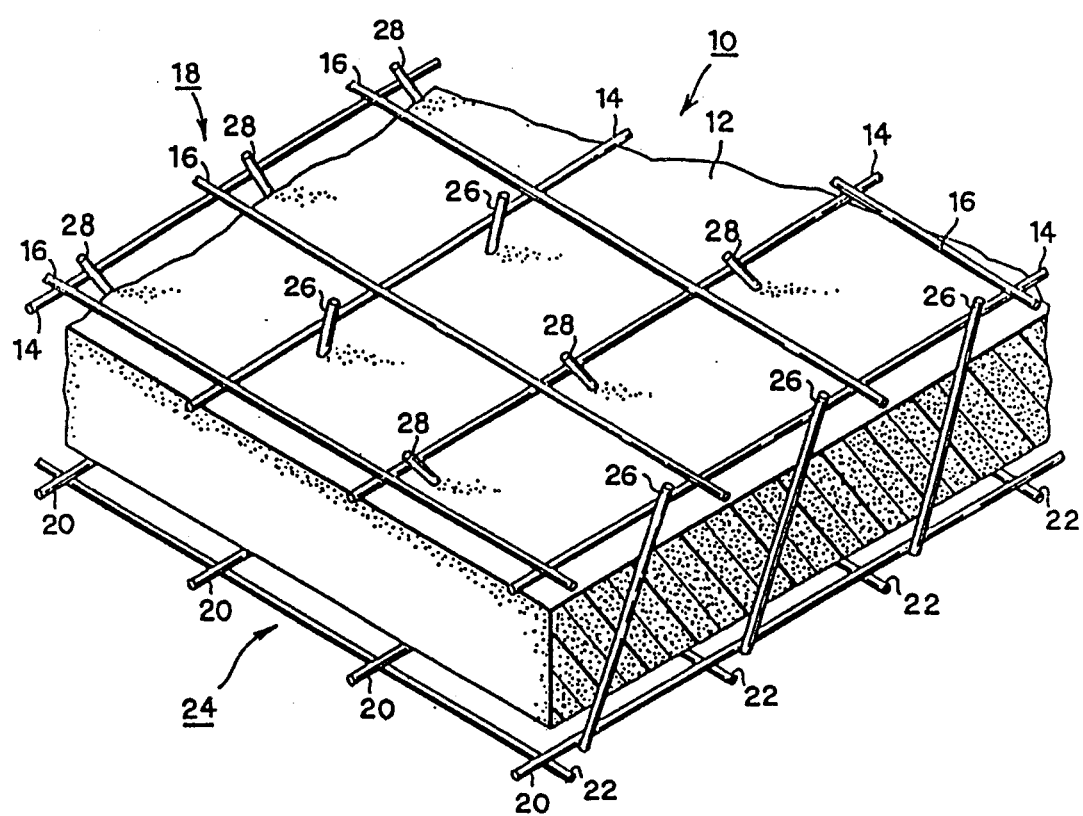
FIG. 1 is a fragmentary perspective view of a panel manufactured by the supporting member feeding device of the present invention.
Figure 2:
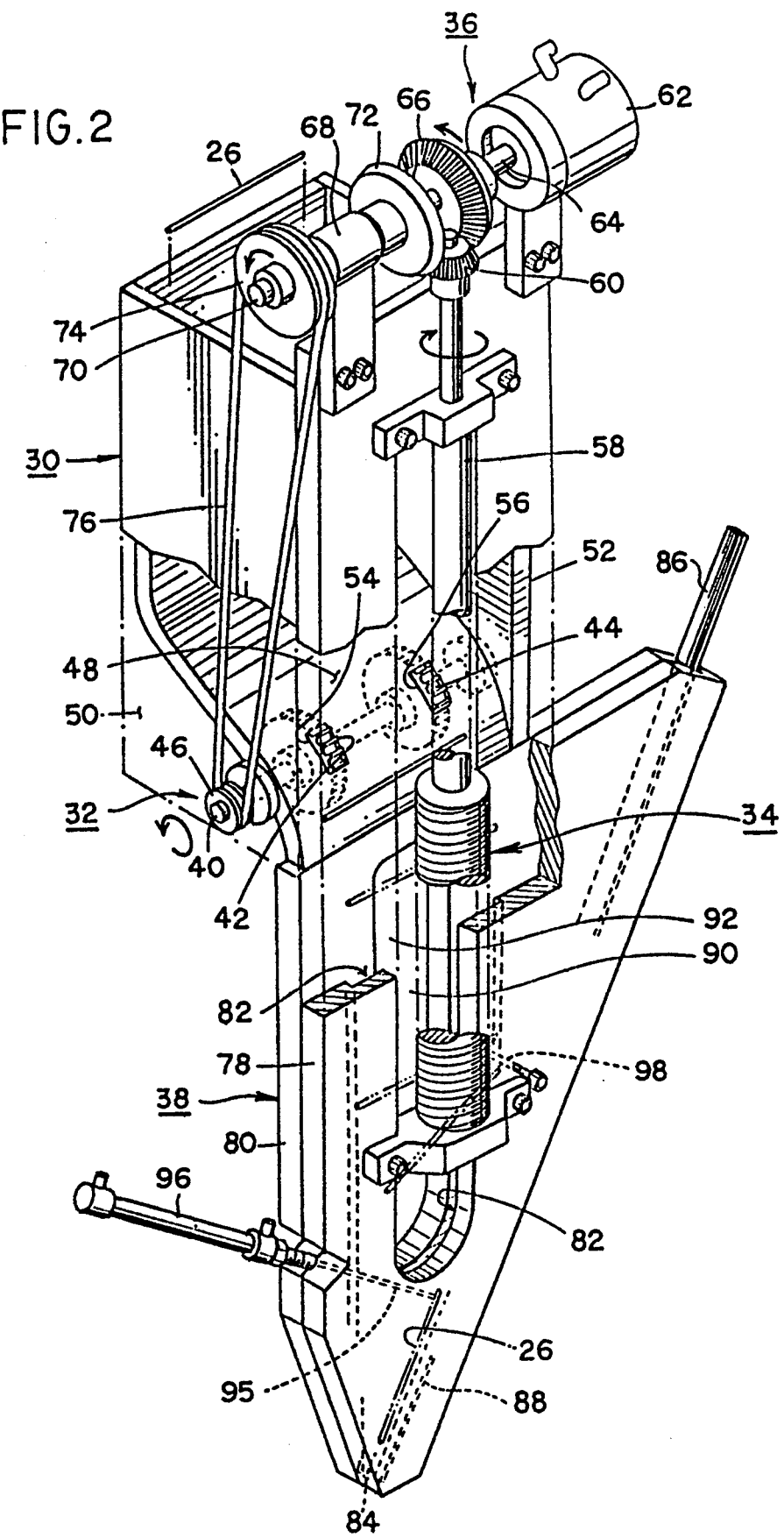
FIG. 2 is a perspective view of the supporting member feeding device of the present invention.

As shown in FIG. 2, the feeding device of the present invention has a hopper 30 which contains supporting members 26 or 28 (hereinafter referred to only as 26) previously cut to a predetermined length. A supporting member conglomeration preventing mechanism 32 is provided for positively scattering the supporting members 26 which are contained in the hopper 30 and which conglomerate at its lower side. A spiral conveyor 34 is arranged for continuously conveying the supporting members contained within the hopper 30, keeping a predetermined distance therebetween. A driving mechanism 36 is provided for driving together the spiral conveyor 34 and the supporting member conglomeration preventing mechanism 23. The device also has a chute forming member for discharging the supporting members.

A rotary shaft 40 extends through the rear side of an inclined wall 48 of the hopper 30 and is rotatably supported in both side walls 50,52 of the hopper 30. Gears 42 and 44 are arranged so that a part of their teeth extend into an interior of the hopper 30 through holes 54,56 perforated in the inclined wall 48 as shown in FIG. 4. The teeth of the gears 42,44 contact with the supporting members which are located at the lower side of the hopper 30 and which are pressed by the supporting members located at the upper side, so that when the gears 42,44 are rotated, they positively scatter the supporting members and prevent their conglomeration. A driven pulley 46 is fixed to an end of a rotary shaft 40 extending outside of one side wall 50 of the hopper 30. Another rotary shaft 58 extends at an upper portion of the spiral conveyor 34, and a driven bevel gear 60 is fixed to an uppermost end of this rotary shaft 58. Upper and lower members of the entire spiral conveyor 34 are rotatably supported on a chute forming member 38 for discharging the supporting member.

The driving mechanism 36 of the device includes an oil pressure loader 62 fixed to a side of the upper end of the chute forming member 38, and a driving bevel gear 66 fixed to a rotary shaft 64 of the oil pressure loader 62.

The driven gear 60 to be engaged with the driving gear 66 is engaged with another driven bevel gear 72 which is fixed to one end of a rotary shaft 70 rotatably inserted in a bearing member 68 fixed to another end of said chute forming member 38. A driving pulley 74 is fixed to another side of the rotary shaft 70 while the driven pulley 46 is fixed to the rotary shaft 40 of the supporting member conglomeration preventing mechanism 32. The pulleys are connected with one another by a belt 76.

The chute forming member 38 for discharging the supporting member has a spiral conveyor 34, a first plate member 78 with the attached driving mechanism 36, and a second plate member 80 with an inclined wall 38 contacting the hopper and both side walls 50,52. A chute 82 for discharging the supporting member is formed in an interior surface of the first plate member 78, which surface faces the second plate member 80.

Figure 3:
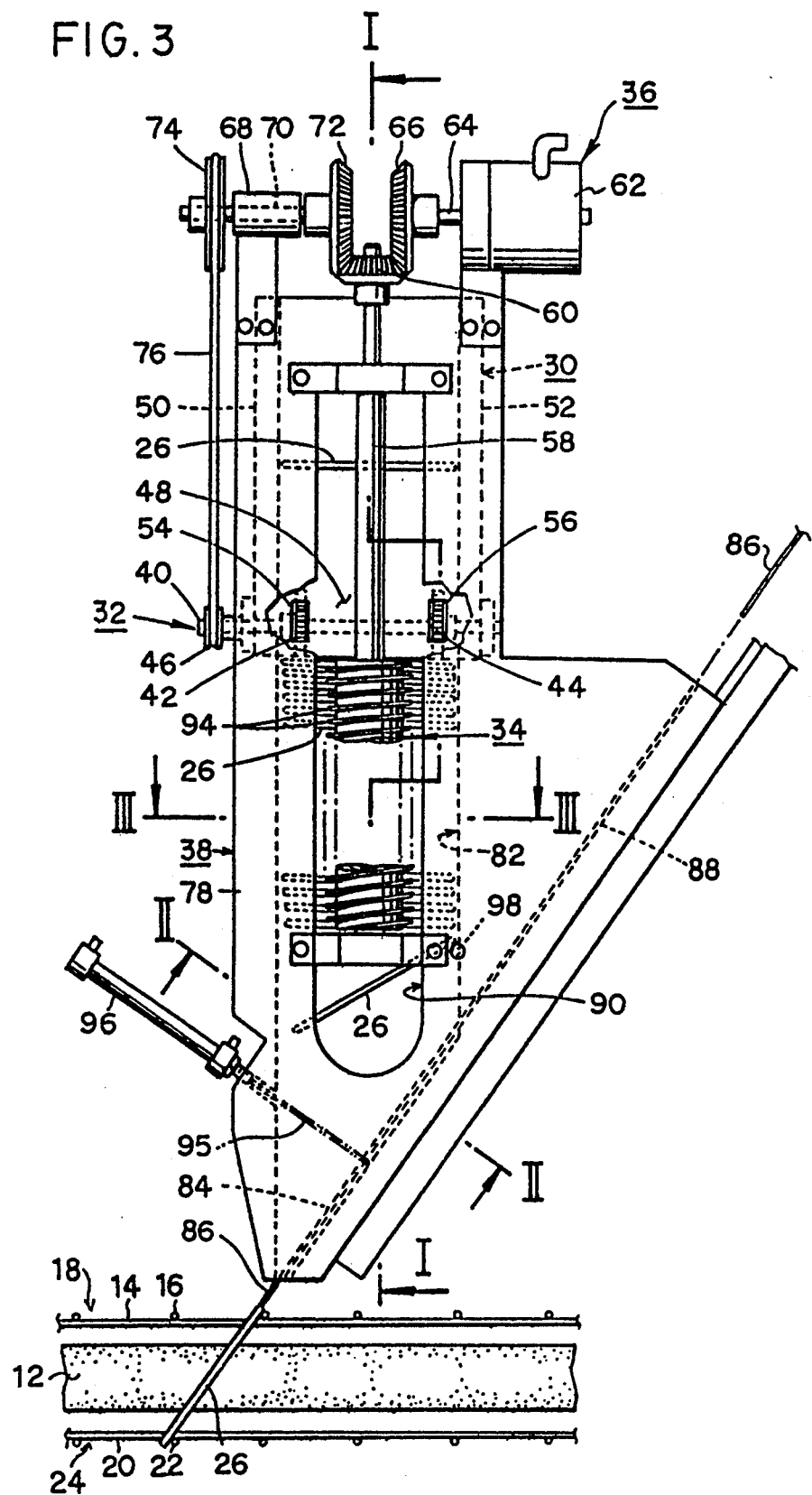
FIG. 3 is a side view of the supporting member feeding device of the present invention showing a position in which the supporting member is inserted through the upper wire mesh, an insulating core material and the lower wire mesh making the construction panel.

An inclined discharging outlet 84 is formed at the lowermost side of the chute 82. A hole 88 is further formed, in which a thin and long plate-like plunger 86 for pushing the supporting member can be slid as shown in FIG. 2, FIG. 3 and FIG. 5. Holes 90,92 are respectively formed in a latitudinal direction to the first plate member 78 and the second plate member 80. They are formed so that the teeth 94 of the spiral conveyor 34 can be rotated within the chute 82 through the hole 90 of the first plate member 78, and a feeding state of the supporting member by the spiral conveyor 34 can be seen through the hole 90 and the hole 92 of the second plate member 80.

A piston rod 95 of a pneumatic cylinder 96 is extendable up to the inclined discharging outlet 84 at the front side of the chute forming member 38, so that the supporting member 26 which is conveyed by the spiral conveyor 34 and drops toward the inclined discharging outlet 84 can be arranged side-by-side with the inclined discharging outlet 84.

It is desirable in accordance with the present invention to arrange the lowermost end of the spiral conveyor 34 to be as close as possible to the inclined discharging outlet 84 as shown in FIG. 2 and FIG. 3. But it should be distanced away by a certain degree from the inclined outlet 84 in order to place the supporting member side by side with the inclined discharging outlet 84.

When the supporting member is released from the teeth 94 located at the lowermost end of the spiral conveyor 34 it is free-dropped toward the inclined discharging outlet 84. At this moment, in order to place the supporting member side by side with the inclined discharging outlet 84, an end of a rod 98 contacts the free-dropped supporting member and changes its direction to an inclined state from the horizontal dropping state. The rod 98 is arranged in the chute 82 at a lower side of the spiral conveyor 34 and close to the inclined discharging outlet 84.

The chute 82 can also be made by forming a groove with a depth and width such that the supporting member 26 can pass through the groove as shown in FIG. 6. However, in this case it is difficult for the supporting member 26 to easily pass through if it is bent only a little during manufacturing or handling. However, the supporting member in the bent state to a certain degree can be smoothly fed by providing preferably more than two guide rails 100 formed as protuberances, instead of making the depth to be deeper than the thickness of the supporting member as shown in FIG. 7.

The feeding device in accordance with the present invention operates in the following manner:

As shown in FIG. 3 and FIG. 4, the teeth of the gears 42,44 rotating in a moving direction of the supporting members 26 and an opposite direction thereof move the supporting members 26 located there and scatter the supporting members 26 conglomerated at the outlet side of the hopper 30 even if the supporting members located at the lower side of the hopper 30 are pressed and conglomerated by the supporting members 26 located at the upper side of the hopper 30. The supporting members 26 move toward the chute 82 through the outlet of the hopper smoothly one by one, and the supporting members 26 advanced to the chute 82 are caught one by one between the teeth 94 of the spiral conveyor 34 rotating again in a clockwise direction whereby they continuously descend along the chute 82.

Successively, the supporting members 26 are released from the teeth 94 located at the lowermost end of the spiral conveyor 34 and then free-drop by self weight. At this time, an end of the supporting member starting the free dropping is dropped toward the inclined discharging outlet 84 and is contacted by a dropping state adjusting rod 98 so as to become inclined. The supporting member 26 dropped toward the inclined discharging outlet 84 is discharged outwardly from the inclined discharging outlet 84 by the plunger 86 driven by a conventional pneumatic type inserting through means and is thereby inserted through the insulation layer 12.

The feeding device of the present invention has an advantage of exactly feeding the supporting members. It is made such that a conglomeration of the supporting members contained within the hopper 30, particularly the supporting members located at the outlet side of the hopper by the weight of the supporting members located at the upper side and the outlet of the hopper, is prevented. The supporting members are positively scattered by the supporting member conglomeration preventing mechanism 32. Thereby the supporting members smoothly move one by one in good order toward the chute 82, the supporting members to be advanced to the chute 82 are engaged by the rotating spiral conveyor 34 and are forcibly fed along the chute 82 one by one.

It will be understood that each of the elements described above, or two or more together, may also find a useful application in other types of constructions differing from the types described above.

While the invention has been illustrated and described as embodied in a supporting member feeding device of a construction panel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for feeding supporting members of a construction panel, comprising a hopper adapted to contain a plurality of supporting members; a plurality of gears having teeth which partially extend into an interior of said hopper to transport the supporting members through said hopper; means forming a chute for discharging the supporting members from said hopper and provided with at least one through-hole; and a spiral conveyor having teeth extending into said chute through said hole and transporting the supporting members through said chute, said chute forming means having a guide rail provided with at least two protuberances for guiding the supporting members.

2. A feeding device as defined in claim 1, wherein said hopper has an inclined wall with an outlet side, said gears being arranged at said outlet side of said inclined wall.

3. A device for feeding supporting members of a construction panel, comprising a hopper adapted to contain a plurality of supporting members; a plurality of gears having teeth which partially extend into an interior of said hopper to transport the supporting members through said hopper; means forming a chute for discharging the supporting members from said hopper and provided with at least one through-hole; and a spiral conveyor having teeth extending into said chute through said hole and transporting the supporting members through said chute, said chute having a discharging outlet, said chute being also provided with a rod located under said spiral conveyor close to said discharging outlet so as to facilitate a discharging of said supporting members through said discharging outlet.

4. A feeding device as defined in claim 3, wherein said chute forming means has a first plate member and a second plate member which define said chute, said hole being provided in one of said plate members.

5. A feeding device as defined in claim 4, wherein another of said plate members is provided with a through-hole as well.

6. A feeding device as defined in claim 3, wherein said discharging outlet of said chute is inclined.

* * * * *